(12) United States Patent
Christopoulos et al.

(10) Patent No.: US 6,961,754 B2
(45) Date of Patent: Nov. 1, 2005

(54) INTERACTIVE ACCESS, MANIPULATION, SHARING AND EXCHANGE OF MULTIMEDIA DATA

(75) Inventors: Charilaos Christopoulos, Sollentuna (SE); Niklas Björk, Sundbyberg (SE); Francisco Rivas, Kista (SE); Göran A P Eriksson, Sundbyberg (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 741 days.

(21) Appl. No.: 09/758,395

(22) Filed: Jan. 12, 2001

(65) Prior Publication Data

US 2002/0143972 A1 Oct. 3, 2002

(51) Int. Cl.⁷ .............................................. G06F 15/16
(52) U.S. Cl. ........................ 709/204; 709/205; 709/231
(58) Field of Search ................................ 709/204, 206, 709/231, 201, 203, 205, 213, 200, 228, 232, 246, 247; 715/507, 513, 735, 784

(56) References Cited

U.S. PATENT DOCUMENTS

| | | | | |
|---|---|---|---|---|
| 5,418,789 A | * | 5/1995 | Gersbach et al. ........... 714/705 |
| 5,535,332 A | * | 7/1996 | Ishida ........................ 709/205 |
| 5,983,004 A | | 11/1999 | Shaw et al. |
| 6,157,924 A | * | 12/2000 | Austin ........................ 715/513 |
| 6,167,441 A | | 12/2000 | Himmel |
| 6,332,131 B1 | * | 12/2001 | Grandcolas et al. ........ 715/784 |
| 6,411,836 B1 | * | 6/2002 | Patel et al. .................. 600/407 |
| 6,412,008 B1 | * | 6/2002 | Fields et al. ................ 709/228 |
| 6,421,733 B1 | * | 7/2002 | Tso et al. .................... 709/246 |
| 6,434,543 B1 | * | 8/2002 | Goldberg et al. .............. 707/2 |
| 6,470,378 B1 | * | 10/2002 | Tracton et al. .............. 709/203 |
| 6,507,865 B1 | * | 1/2003 | Hanson et al. .............. 709/206 |
| 6,563,517 B1 | * | 5/2003 | Bhagwat et al. ............ 715/735 |
| 6,571,271 B1 | * | 5/2003 | Savitzky et al. ............ 709/200 |
| 6,587,596 B1 | * | 7/2003 | Haeberli ...................... 345/626 |
| 6,615,212 B1 | * | 9/2003 | Dutta et al. ................. 709/203 |
| 6,697,341 B1 | * | 2/2004 | Roy ........................... 709/204 |
| 6,760,749 B1 | * | 7/2004 | Dunlap et al. .............. 709/204 |

FOREIGN PATENT DOCUMENTS

GB        2 319 135 A        5/1998

OTHER PUBLICATIONS

Mohan R., Smith J R, Adapting Multimedia Internet Content For Universal Access, IEEE Transctions on Multimedia, Mar. 1999, vol. 1 issue, pp. 104–114.*

* cited by examiner

Primary Examiner—Ario Etienne
Assistant Examiner—Ramy M. Osman (57) ABSTRACT

In a multimedia environment, end-users are provided with the ability to effectively access, manipulate and share one or more multimedia objects, or select portions thereof, independent of the terminal and/or network capabilities that are associated with the terminals employed by each end-user. This may be accomplished, for example, by identifying a set of multimedia data that is stored in a multimedia database that is accessible by each end-user. The set of multimedia data is then adapted in accordance with an information adaptation service and modified in accordance with a transcoder/scalability service. The functions provided by both of these services are based on a number of user preferences and based on a number of terminal and communication (e.g., network) connection capabilities associated with the terminals corresponding to each of the end-users that are to have access to the modified set of multimedia data.

20 Claims, 7 Drawing Sheets

INTERACTIVE ACCESS, MANIPULATION, SHARING AND EXCHANGE OF MULTIMEDIA DATA

FIELD OF INVENTION

The present invention involves the field of multimedia. More particularly, the present invention involves conversational multimedia services.

BACKGROUND

Multimedia involves communicating information over a combination of different media, where the term media refers to the means by which the information is conveyed. Different types of media include, for example, audio, video, still images, animation, and text.

Computer based multimedia applications are now common place. In the not too distant past, however, multimedia applications were relatively uncommon due to the quantity of data involved, the speed and storage capacity limitations of computers and computer based telecommunication devices, and the bandwidth limitations associated with the network connections linking these devices. Today, nearly all personal computers have the capability to handle multimedia applications.

Recent advancements in computer and telecommunication technologies have led to the development and widespread use of new classes of computers and computer based telecommunication devices, and in particular, smaller, mobile (i.e., wireless) devices. These include, but are not limited to, laptop computers, hand-held computers, personal digital assistants (i.e., PDAs), and smart, web-enabled mobile telephones. Consequently, there is an increasing demand to design these new classes of computers and computer based telecommunication devices so that they, like most personal computers, are capable of handling multimedia applications.

Conversational multimedia is a type of multimedia service that allows two or more network devices to simultaneously execute a multimedia application, such as a video conferencing application or a still image sharing application, where the two or more network devices may include personal and/or portable computers, servers, telecommunication devices, or other like devices, and where the two or more network devices are connected to one another by one or more computer networks (e.g., wide area and/or local area networks). Generally speaking, the two or more network devices engaged in a conversational multimedia session must simultaneously access, manipulate, and exchange data stored in a multimedia database. Despite many recent technological advancements in the computer and telecommunication industry, there are may problems associated with providing effective conversational multimedia services.

A first problem associated with conversational multimedia is that each of the two or more network devices engaged in a multimedia session may have different terminal capabilities. For purposes of the present invention, "terminal capabilities" refer to the performance limitations associated with each of the two or more network devices that are engaged in the conversational multimedia services session. These performance limitations might include, for example, bandwidth limitations, bit error rate limitations, display screen size and resolution limitations, storage capacity limitations, and of course, processing power limitations. The reason why this is problematic is that one device may be able to effectively access and manipulate a certain multimedia object stored in the database, while another one or more of the devices may not be able to effectively access and manipulate the same multimedia object, due to performance limitations. For instance, user A who is associated with a first network device may want to manipulate a multimedia object (e.g., a still image) and, thereafter, transmit the manipulated object to user B, who is associated with a second network device. More specifically, user A may want to zoom to a particular region of interest (ROI) in the image, and then exchange the zoomed version of the image with user B. Alternatively, user A may want to crop a portion of the image, and exchange the cropped portion of the image with user B. User A, however, may be employing a personal computer that is capable of displaying an image that is 1280×1024 pixels, while user B is employing a hand-held computer that is only capable of displaying an image that is 88×104 pixels. If user A does not know in advance the terminal capabilities of user B and, as a result, fails to properly adapt the manipulated version of the image so that it is as compatible as possible with the terminal capabilities of user B, user A may successfully transmit the manipulated image to user B, but it is unlikely user B will be able to effectively access the manipulated image.

A second problem is that each of the two or more network devices may be subject to different network capabilities. It will be understood that each of the two or more network devices may receive and transmit multimedia data over a wide variety of different network connections, for example, computer network connections, telephone connections, integrated services digital network (ISDN) connections, asynchronous transfer mode (ATM) connections, and mobile network connections, where each is capable of supporting a different load capacity. Thus, if the network device employed by user A has a high-speed network connection while the network device employed by user B has a significantly lower-speed network connection, transferring multimedia information from the device associated with user A to the device associated with user B without properly adapting the information (e.g., applying an appropriate data compression scheme) may result in user B being unable to effectively access the information.

One possible solution for the above-identified problems is to store and maintain multiple versions of a given multimedia object in a multimedia database, where each version more suitably corresponds to a different combination of terminal and/or network capabilities. Unfortunately, this solution requires an excessive amount of storage capacity in order to store and maintain different versions of a multimedia object for each and every conceivable combination of terminal and/or network capabilities. Furthermore, the amount of time and processing power that would be required to individually manipulate each version makes this solution less than ideal.

Another possible solution is to store and maintain a single, adaptable version of a multimedia object. For example, JPEG2000 provides a standard coding scheme that permits images to be stored in a single, multi-resolution format. Therefore, a single version of an image can be down-scaled or up-scaled to satisfy the resolution requirement for each of several network devices. Accordingly, a network device that has a relatively high resolution capability has the ability access a high resolution version of the image, whereas a network device that has a relatively low resolution capability has the ability to access a low resolution version of the same image. While this solution alleviates the need to store a different version of the multimedia object for each and every conceivable level of resolution, it does not directly address the fact that the various network devices engaged in a conversational multimedia session are likely to exhibit other terminal and/or network capability differences. Consequently, this solution also fails to guarantee that each network device will be able to effectively access a multimedia object.

Yet another possible solution involves the use of transcoders. A transcoder accepts a data stream that is encoded in accordance with a first format and outputs the data stream encoded in accordance with a second format. In this solution, one version of a multimedia object, or a limited number of versions, is stored and maintained in a server. The data associated with the one, or the most appropriate version, is then converted by a transcoder located in the server, or located in a corresponding gateway, such that the converted version of the multimedia object is compatible with a particular combination of terminal and/or network capabilities and/or user preferences.

In general, the use of transcoders is well known to those of skill in the art. For example, it is known that a transcoder may be employed to convert an image from a first size to a second size. Thus, an image that is 4K×4K pixels may be stored in a server, though the network device that is to receive and/or gain access to the image is only capable of displaying an image that is 256×256 pixels. A transcoder may than be employed to convert, or transcode, the 4K×4K version of the image prior to making the image available to the receiving network device. This scenario is described in International Patent Application PCT/SE98/00448.

In another example, it is known that a transcoder may be employed to convert a video object from a first format (e.g., CIF) to a second format (e.g., QCIF), prior to making the video object available to the receiving device. This scenario is described in International Patent Application PCT/SE97/01766. It is also describe in Christopoulos et al., "*Transcoder Architectures for Video Coding*", IEEE Transactions on Consumer Electronics, Vol. 44, pp. 88–98, February 1998.

In each of the solutions involving transcoders, there is an assumption that the transcoder is capable of deciding how the conversion of the multimedia object is to be implemented. However, this is not a correct assumption. In fact, there is simply no guarantee that a multimedia object which has been transcoded from one format to another will be delivered to or accessed by a given network device in an effective and meaningful manner.

Given the foregoing discussion, it is evident that there is a tremendous need to provide a conversational multimedia service that permits each of the two or more computer or computer based telecommunication devices to effectively manipulate, share and exchange multimedia objects stored in a multimedia database, despite the existence of different user preferences the fact that the one or more computer and/or computer based telecommunication devices may exhibit significantly different network and/or terminal capabilities.

SUMMARY OF THE INVENTION

In accordance with one exemplary embodiment of the present invention, a single, independent end-user runs a multimedia application on a local terminal and, in conjunction therewith, imports one or more multimedia objects, or portions thereof, from a multimedia database. The multimedia database is stored in or accessed by an external device, such as a media server. Prior to importing the one or more multimedia objects, the objects, or portions thereof, are selected in accordance an Information Adaptation Service, and intelligently converted, recoded and/or scaled by a Transcoder/Scalability Service. The Information Adaptation Service and the Transcoder/Scalability Service both rely on a set of user preferences and a set of terminal and/or network capabilities (e.g., available bandwidth, bit error rate, display size, resolution, computational processing power, storage capacity). The information and/or data which defines the user preferences as well as the network and terminal capabilities is either provided to the external device or stored in one or more databases that are accessible by the external device.

In accordance with other exemplary embodiments of the present each of two or more end-users run a shared multimedia application, and where each employs a terminal device that exhibits different terminal and/or network capabilities. Again, these embodiments are achieved by sharing multimedia objects, or portions thereof, that have been selected and intelligently converted in accordance with an Information Adaptation Service and a Transcoder/Scalability Service.

Accordingly, it is an objective of the present invention to provide an intelligent multimedia services environment.

It is another objective of the present invention to provide intelligent selection and adaptation of multimedia data in a multimedia services environment.

It is yet another objective of the present invention to provide an end-user in a multimedia services environment with the ability to effectively access a multimedia object, or a select segment, region or portion thereof, independent of the terminal and/or network capabilities associated with the terminal employed by the end user.

It is still another objective of the present invention to provide two or more end-users, in a conversational multimedia environment, with the ability to effectively access a multimedia object, or a select segment, region or portion thereof, independent of the terminal and/or network capabilities associated with the terminals employed by the end-users.

The present invention achieves the above-identified and other objectives with a multimedia system that includes one or more end-user terminals and an external device, where the one or more end-user terminals and the external device are capable of communicating with one another. The system also includes means for modifying a set of multimedia data, which is accessible by the external device, for one or more end-users. The modification is based on a number of end-user preferences and based on a number of terminal and communication connection capabilities which individually correspond with each terminal employed by each of the one or more end-users. The external device includes means for making the modified set of multimedia data accessible to each terminal employed by the one or more end-users.

The present invention also achieves the above-identified and other objectives with a method for achieving a conversational multimedia session that involves a plurality of end-users, where each end-user has access to a multimedia database. The method involves identifying a set of multimedia data that is stored in the multimedia database. After identifying the set of multimedia data, the set of multimedia data is modified, in accordance with a transcoder/scalability service, based on a number of user preferences and based on a number of terminal and communication connection capabilities associated with one or more end-user terminals which correspond to one or more end-users that are to have access to the modified set of multimedia data. Once the set of multimedia data has been modified, it is made available to the one or more end-users.

The present invention also achieves the above-identified and other objectives with a network based multimedia system for achieving a conversational multimedia session between two end-users. The system includes a multimedia database which is accessible to both end-users. The system also includes means for identifying a set of multimedia data that is stored in the multimedia database. After the set of multimedia data has been identified, the system employs a transcoder/scalability service means for modifying the set of multimedia data, based on a number of user preferences associated with one or both end-users, and based on a number of terminal and network connection capabilities associated with an end-user terminal corresponding to one or both end-users. Finally, the system employs means for making the modified set of multimedia data available to one or both of the end-users.

BRIEF DESCRIPTION OF THE FIGURES

The objectives and advantages of the present invention will be understood by reading the following detailed description in conjunction with the drawings, in which.

DETAILED DESCRIPTION OF THE INVENTION

The various aspects of the present invention are described below in terms of several exemplary embodiments and scenarios. In a first exemplary embodiment, a single end-user in communication with an external device, such as a media server or a camera, is capable of receiving a multimedia services presentation from the external device, and accessing therefrom, one or more multimedia objects in accordance with the various aspects of the present invention.

In other exemplary embodiments, two or more users, simultaneously engaged in a conversational multimedia session, access one or more multimedia objects stored in a multimedia database in accordance with various aspects of the present invention.

Figure 1:
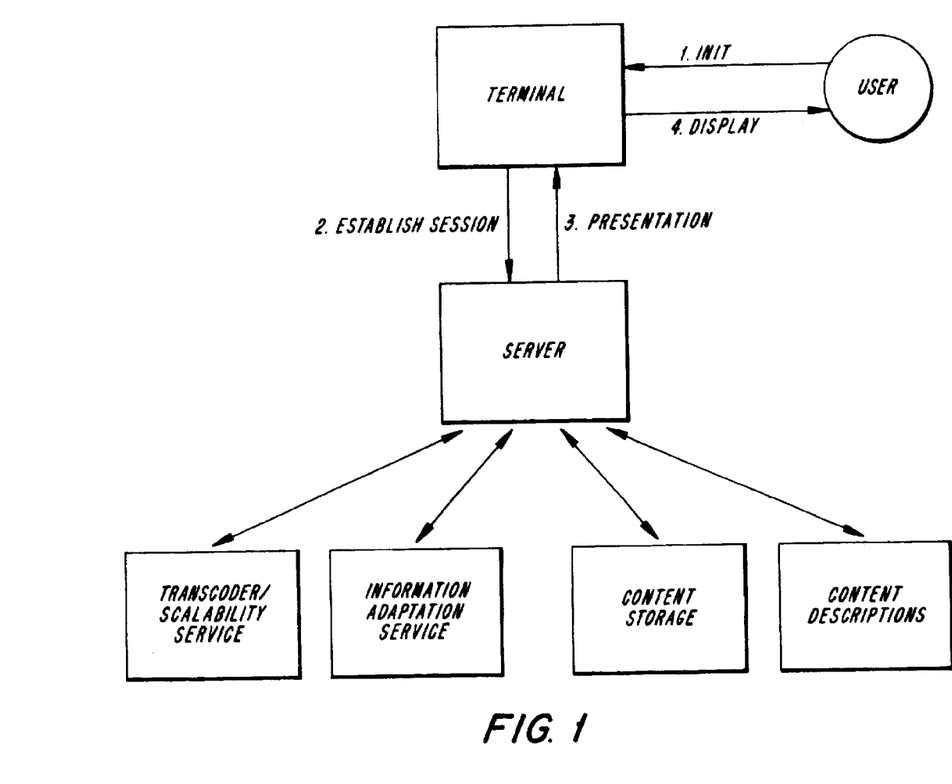
FIG. 1 illustrates a technique that permits an end-user to receive a multimedia services presentation from an external device, in accordance with an exemplary embodiment of the present invention.

FIG. 1 illustrates a technique that permits an end-user to receive a multimedia services presentation from an external device, such as a media server or a camera, in accordance with a first exemplary embodiment of the present invention. Through this multimedia services presentation, the end-user is able to select, access, manipulate and otherwise work with multimedia objects, in accordance with the various aspects of the present invention.

As shown in step 1 of the technique, the end-user initiates the process by invoking the terminal device to execute a multimedia application (e.g., an electronic photo album application). The end-user may achieve this, for example, through any of a number of well-known user interfaces that are designed to support the operation of the terminal device, where the terminal device is, for example, a computer or computer based telecommunication device.

In step 2 of the illustrated technique, the terminal device then establishes a session (e.g., a Hyper Text Transfer Protocol [HTTP] session) with the media server (i.e., the external device). The purpose of this step is to identify, for the media server, the information and/or data needed to support two important services: an Information Adaptation Service and a Transcoder/Scalability Service. The function that these Services perform, and the information and/or data needed to support them, are described in greater detail below. The terminal device may accomplish this step by simply forwarding the needed information and/or data to the media server; although, in a preferred embodiment, the terminal device instead forwards the location of one or more databases (e.g., a network address) which contain the needed information and/or data. It will be noted that the contents of the one or more databases which contain the information and/or data needed to support the Information Adaptation Service and the Transcoder/Scalability Service may be dynamically updated so that they reflect the most current information.

Further in accordance with a preferred embodiment of the present invention, the external device, or media server, communicates with the terminal device over a local or wide area network. However, one skilled in the art will readily appreciate that the external device may be a server that is capable of performing other functions, or that the external device is, in fact, a local device that is directly associated with the terminal device, such as disk drive or a local network server.

As mentioned, the present invention provides two important services. The first of these two services is referred to herein as the Information Adaptation Service (IAS). This service assists in the selection of one or more multimedia objects or specific portions thereof, from amongst other objects that are stored in the database. The IAS makes this determination based on a number of factors including various user preferences and various terminal and/or network capabilities, which are defined by the aforementioned information and/or data that is forwarded to the media server by the terminal device, as explained above, or stored in one or more databases which are accessible to the media server. The user preferences may include, for example, information and/or data that defines one or more multimedia objects of particular interest to the end-user, from amongst a plurality of objects; the location of a portion or portions of a multimedia object that is of particular interest to the end-user; the relative importance (i.e., significance) of a particular object compared to other objects, or of a particular portion of an object compared to other portions of the object; and/or the amount the end-user is willing to pay in order to use the multimedia service (e.g., cost per bandwidth). For example, in a video application, the IAS may employ the user preference information to select a particular video object from amongst a number of candidate video objects, and therefrom, extract a particular 45 second clip. In a still image application, the IAS may employ the user preference information to select a particular image from amongst a number of candidate images, and therefrom, extract one or more regions of interest (ROI).

The second service is referred to herein as the Transcoder/Scalability Service (TSS). The purpose of the TSS is to intelligently and automatically adapt the one or more selected objects, or portions thereof, as a function of the user preferences, the terminal capabilities associated with the terminal device (e.g., screen size, screen resolution, processing power and codec format) and the network capabilities associated with the communication channel over which the terminal device and the media server communicate (e.g., available bandwidth or bit error rate). For example, in the video application, the TSS may intelligently scale the bit stream associated with the 45 second video clip to preserve the video quality for the end-user, given the various user preferences and terminal and network capabilities associated with the end-user's terminal device. In the still image application, the TSS may intelligently adjust the resolution of a particular ROI within a still image to maximize the image quality for the end-user, given the various terminal and network capabilities associated with the end-user's terminal device.

In the third step of the technique illustrated in FIG. 1, the media server responds to the terminal device by presenting the various services that are available to the end-user. The media server may achieve this by providing an interface through which the end-user is able to execute any of the available services. Where the end-user has invoked an electronic photo album application, the services may include an "ADD PHOTO" service, and "EDIT PHOTO" service, a "SHARE PHOTO" service, or the like. The terminal device, as shown in step 4, then displays the services presentation, for example, in the form of a web page.

As stated, the information and/or data defining the multimedia objects (e.g., still images, video objects, text objects, audio objects) is stored in one or more databases. In FIG. 1, the block labeled "CONTENT STORAGE" represents the one or more databases that contain this information. The block labeled "CONTENT DESCRIPTIONS" represents one or more databases that contain descriptive information about the stored multimedia objects, such as MPEG descriptions associated with the video objects, or JPEG descriptions associated with the still image objects.

Figure 2:
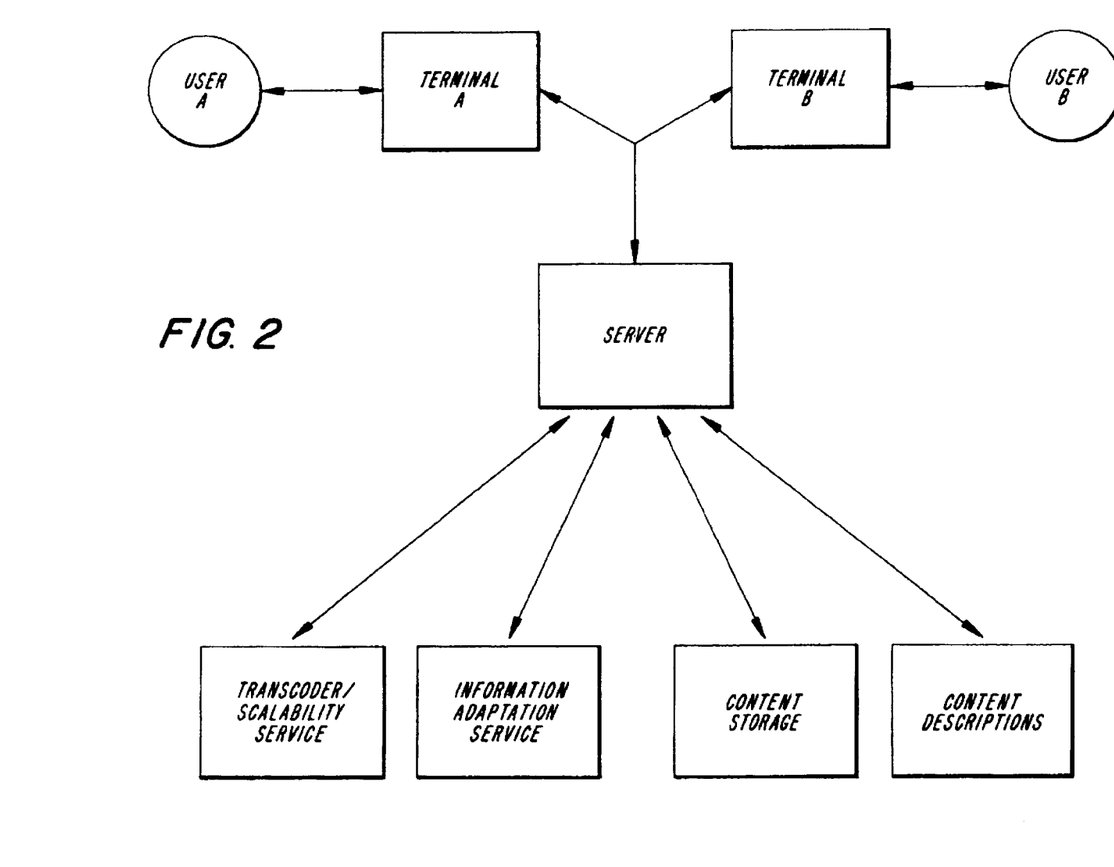
FIG. 2 illustrates a relationship between a server and two end-users are engaged in a conversational multimedia session, in accordance with an exemplary embodiment of the present invention.

FIG. 2 illustrates a relationship between two end-users, $U_A$ and $U_B$, and a server (e.g., a media server), wherein $U_A$ and $U_B$ are engaged in a conversational multimedia session. While this illustration involves two end-users, one skilled in the art will appreciate from the following discussion that a conversational multimedia session, and hence the present invention, may involve more than two end-users. Unlike the embodiment described above, with reference to FIG. 1, a conversational multimedia session generally involves the manipulation of a media object by one end-user prior to making that object available to one or more other end-users. In one example, $U_A$ might manipulate a still image by cropping the image, selecting a particular ROI from the image as a whole, re-sizing the image, or rotating the image. Then, in accordance with exemplary embodiments of the present invention, the media server adapts the manipulated object, or causes the object to be adapted, in accordance with the IAS and the TSS, to best satisfy the user preference and terminal and network capabilities associated with $U_B$, prior to making the object available to $U_B$.

Further in accordance with FIG. 2, the block labeled "TRANSCODER/SCALABILITY SERVICE" represents, of course, the TSS, as well as the information and/or data that is needed to define the user preferences and terminal and/or network capabilities associated with the end-user that is to receive the manipulated object (e.g., $U_B$). The block labeled "INFORMATION ADAPTATION SERVICE" represents the IAS, as well as information and/or data that is needed to define the various user preferences and terminal and/or network capabilities associated with the end-user that is to receive the manipulated object (e.g., $U_B$). The block labeled "CONTENT STORAGE" represents the collection of media objects that might be available to both $U_A$ and $U_B$ through a shared multimedia application, where the collection of media objects may include, for example, audio objects, video object, still images and text objects. The block labeled "CONTENT DESCRIPTIONS" represents the descriptions, i.e., meta-data associated with the various media objects stored in the content storage block. The content descriptions block might contain, for example, MPEG-7 descriptions or JPEG2000 descriptions.

Figure 3:
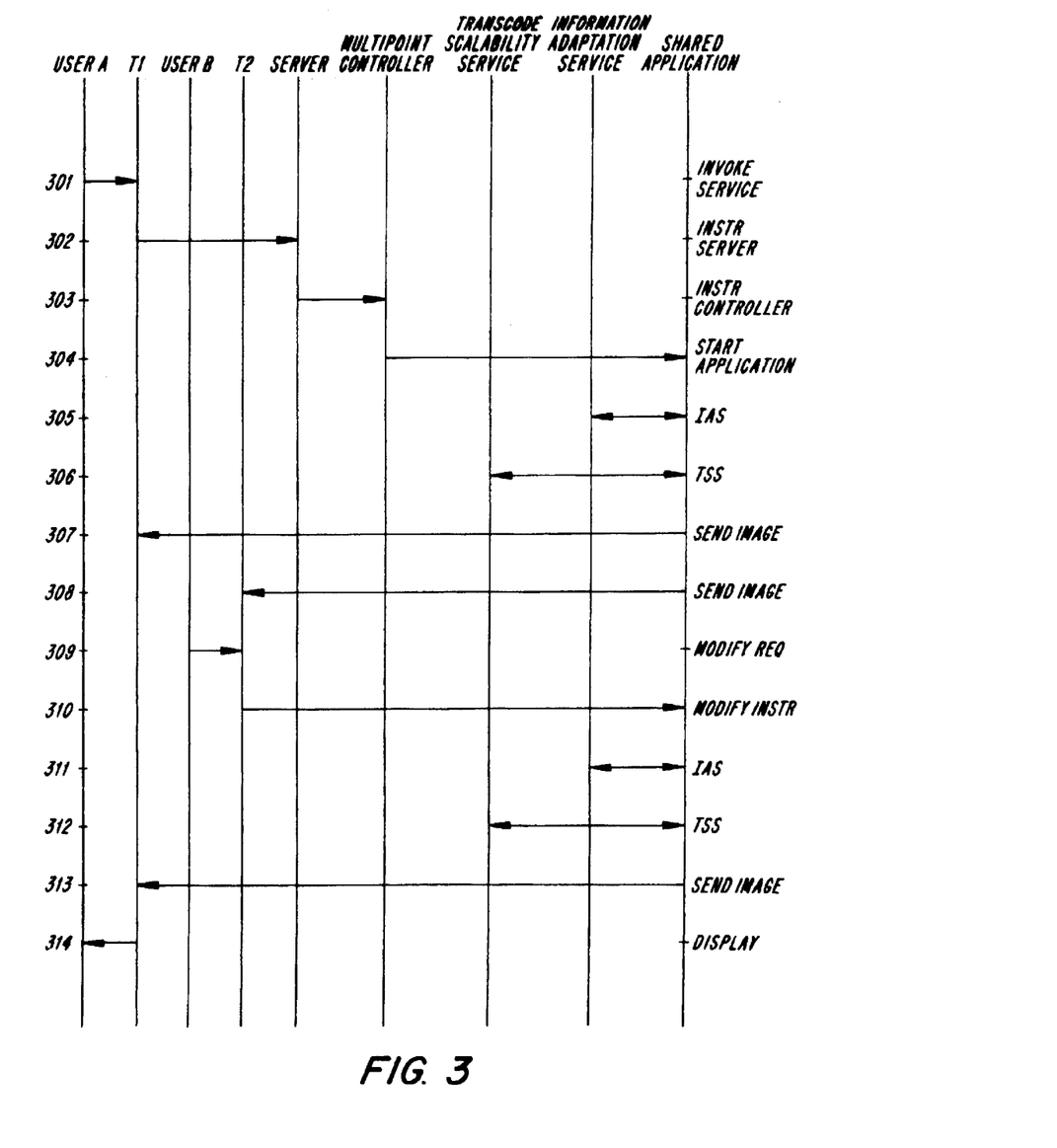
FIG. 3 illustrates a technique for achieving a conversational multimedia session between two end-users, in accordance with an exemplary embodiment of the present invention.

FIG. 3 is a flow diagram that illustrates, in greater detail, a technique for achieving a conversational multimedia session between two end-users, $U_A$ and $U_B$, in accordance with exemplary embodiments of the present invention. In describing this technique, several assumptions are made. First, the shared application (e.g., an electronic photo album application) that is simultaneously employed by $U_A$ and $U_B$ resides in and is executed from a centralized location within the network. Second, the media server employs a multipoint controller to initiate the execution of the shared application. Third, the illustration involves still images, though one of ordinary skill in the art will readily appreciate that this technique may apply with any form of media. Fourth, $U_A$ and $U_B$ have already established a communications link, for example, an audio link, and that each has access to various multimedia services through the media server, as described above with reference to FIGS. 1 and 2.

Initially, a first one of the two end-users (e.g., $U_A$) selects a service. Thus, as illustrated in step 301, $U_A$ invokes an available service through an interface with terminal T1. The selected service may involve, for example, downloading an image X so that $U_A$ and $U_B$ can interact with it. In step 302, terminal T1 instructs the media server to undertake the requested service. That is, to download image X as well as the terminal capabilities, the network capabilities and the user preferences associated with terminal T2 and $U_B$. If the user preferences associated with terminal T2 are unknown, the media server must fetch them from the appropriate location. The media server then, in accordance with step 303, instructs the multipoint controller to start a shared application, where image X, $U_A$, $U_B$, terminal T1, terminal T2 and the various terminal capabilities, network capabilities and user preferences serve as inputs to the shared application. The multipoint controller, as instructed, then starts the shared program, as indicated in step 304.

After the multipoint controller starts the shared application, image X is updated, if necessary, in accordance with the terminal capabilities, network capabilities and the user preferences associated with T1, T2, $U_A$ and $U_B$. As indicated in step 305, the shared application requests that the IAS adapt image X in accordance with the information and/or data that defines the user preferences and terminal and/or link capabilities associated with $U_A$ and $U_B$. Then, as shown by step 306, the shared application requests that the TSS convert, modify and/or recode image X in accordance with the user preferences and terminal and/or network capabilities associated with each of the terminals T1 and T2, for example, modify the data compression format of the image data to one that is supported by the corresponding terminal. In an alternative embodiment, the media server may have stored, or may have access to, multiple versions of image X, where each version is conducive to a particular combination of terminal and/or network capabilities. In this instance, rather than adapting image X, the server could select the most appropriate version of image X for terminal T1 and select the most appropriate version of image X for terminal T2. Once image X has been adapted to satisfy the user preferences associated with $U_A$ and $U_B$, and the terminal and network capabilities associated with terminals T1 and T2, image X is sent to each of the terminals, as indicated by steps 307 and 308.

In addition, after starting the shared application, the multipoint controller begins monitoring inputs from $U_A$ and $U_B$ for changes to image X. In the illustrated technique of FIG. 3, $U_B$ invokes a service which involves modifying image X, as indicated by step 309. Again, $U_B$ accomplishes this through an interface with terminal T2. Terminal T2 then sends an instruction to modify image X to the shared application, as indicated by step 310. Although the specific modification to image X is not indicated in FIG. 3, the modification might involve, for example, scaling image X.

After modifying (e.g., scaling) image X, the shared application once again requests that the IAS adapt the modified image in accordance with the user preferences and terminal and/or network capabilities associated with $U_A$ and $U_B$, as shown in step 311. The shared application also requests that the TSS further modify, convert or recode the image in accordance with the user preferences and terminal and/or network capabilities, as shown in step 312, as well as adjust the data compression format of the image to one that is supported by terminal T1 and one that is supported by terminal T2. The shared application, as shown in step 313, can then send image X to terminal T1, as modified by $U_B$, and adapted in accordance with the IAS and TSS. Terminal T1 then displays the modified and adapted version of image X for $U_A$. Of course, one skilled in the art would readily appreciate that the shared application could also send the modified and adapted version of image X to terminal T2 for $U_B$.

Figure 4:
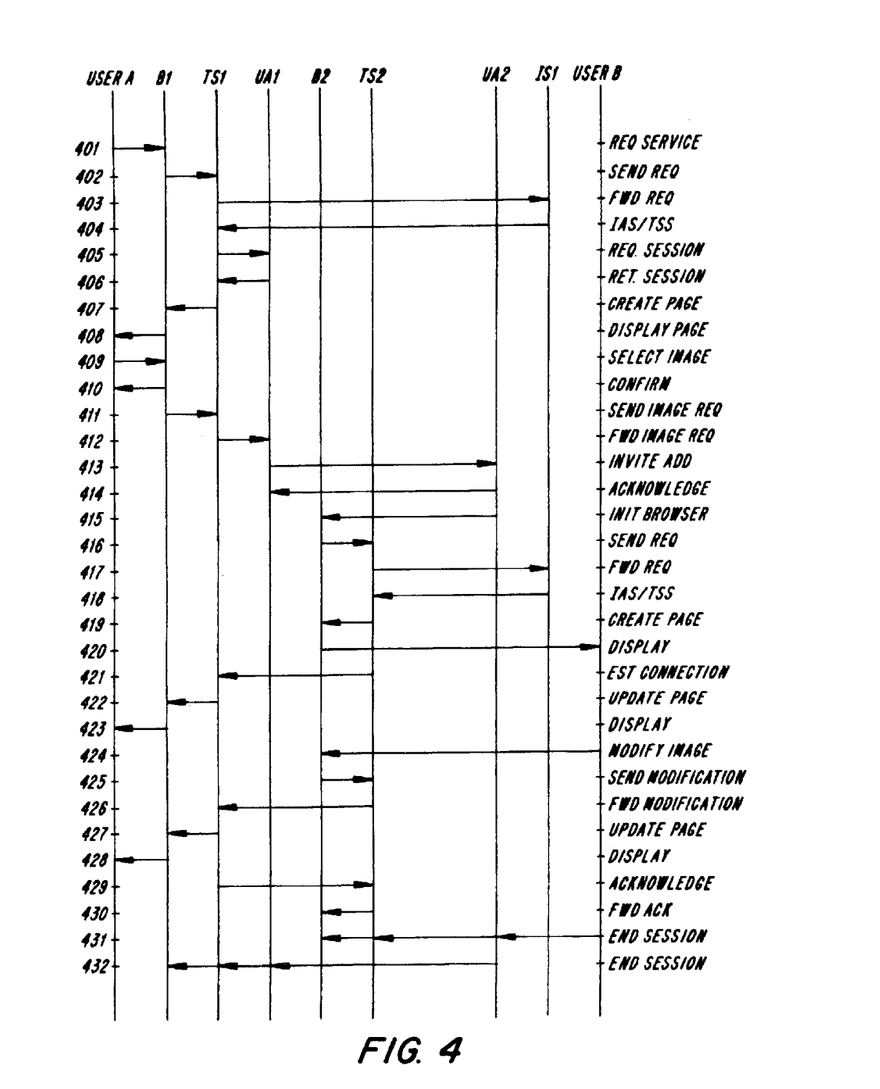
FIG. 4 illustrates a technique for achieving a conversational multimedia session between two end-users, in accordance with another exemplary embodiment of the present invention.

FIG. 4 is a flow diagram that illustrates, in greater detail, a technique for achieving a conversational multimedia session between two end-users, $U_A$ and $U_B$, in accordance with another exemplary embodiment of the present invention. Unlike the illustration presented in FIG. 3, the shared application in this illustration is not centralized; rather, it is distributed among a number of elements. These elements include, for example, browsers B1 and B2, terminal servlets TS1 and TS2, user agents UA1 and UA2, and an image server IS1.

The technique illustrated in FIG. 4 begins with one of the end-users, $U_A$, requesting an available service, as shown by step 401. In this illustration, $U_A$ makes this request by starting browser B1 and directing browser B1 to the Universal Resource Locator (URL) associated with the image server IS1. In response, browser B1 sends an HTTP GET request to terminal servlet TS1, and terminal servlet TS1 translates the HTTP GET request, in accordance with the appropriate protocol, and forwards the request to the image server IS1, as depicted in steps 402 and 403. In step 404, one or more images are adapted by the IAS, in accordance with the user preference, terminal capability and/or network capability information associated with $U_A$, and adapted by the TSS, in accordance with the user preference, terminal capability and/or network capability associated with $U_A$, as well as the data compression scheme needed to support the terminal. The adapted images are then forwarded to terminal servlet TS1. The terminal servlet TS1, in turn, requests that the user agent UA1 identify an ongoing session with $U_B$, as shown by step 405. In step 406, UA1 returns to terminal servlet TS1, the information needed to set up a shared, conversational multimedia session between $U_A$ and $U_B$. With this information, terminal servlet TS1 is able to create an HTML page with the adapted images and the multimedia session as inputs, and forward this to browser B1, in accordance with step 407. Then, in step 408, browser B1 displays the HTML page for $U_A$.

Once $U_A$ has selected the service and the shared multimedia session has been established between $U_A$ and $U_B$, $U_A$ selects from the HTML page presented by browser B1 a particular image that is to be shared with $U_B$. This is shown in step 409. Browser B1 then confirms the selection for $U_A$ and sends a corresponding HTTP GET request to the terminal servlet TS1, as indicated by steps 410 and 411, respectively. The request is seeking to add the selected image as a component to the shared session between $U_A$ and $U_B$. Terminal servlet TS1 then translates the HTTP GET request, in accordance with the appropriate protocol, and forwards the request to user agent UA1, as depicted in step 412. Then, in step 413, the user agent UA1 sends a message to user agent UA2, inviting $U_B$ to add the image selected by $U_A$ to the shared multimedia session. In accordance with steps 414 and 415, the user agent UA2 sends an acknowledgement message back to user agent UA1 and, at the same time, starts browser B2 using the information it received from user agent UA1, including the URL associated with image server IS1. Browser B2 then sends an HTTP GET request to the terminal servlet TS2, and the terminal servlet TS2 forwards the request to the image server IS1, in accordance with steps 416 and 417. In step 418, the image server IS1 invokes the IAS to adapt the image selected by $U_A$, according to the user preferences and the terminal and/or network capabilities associated with both $U_A$ and $U_B$. In addition, the image server IS1 invokes the TSS to adapt the image according to the user preferences and the terminal and/or network capabilities associated with $U_A$ and $U_B$, and to compress the image data in accordance with a data compression scheme that supports these terminals. The image server IS1 then returns the adapted image to the terminal servlet TS2. The terminal servlet TS2 then creates an HTML page using the adapted image, as shown in step 419, and displays it for $U_B$, as shown in step 420. The terminal servlet TS2 also establishes an Image Application Protocol (IAP) connection with terminal servlet TS1, in accordance with step 421. The purpose for this is to inform $U_A$ that the adapted image has been added to the shared conversational multimedia session. In step 422, the terminal servlet TS1 updates its HTML page, thereby acknowledging that $U_B$ has downloaded the adapted image, and sends the updated HTML page to browser B1, as shown in step 422. Then, in step 423, browser B1 displays the updated HTML page for $U_A$.

After the selected image has been added to the shared session, either $U_A$ or $U_B$ can modify the image. Thus, in step

424, it is $U_B$ that decides to modify the image. This is accomplished through the HTML page being displayed by browser B2. Browser B2, in response, sends the modification information to the terminal servlet TS2, as shown in step 425. Then in step 426, terminal servlet TS2 forwards the modification information to TS1. The terminal servlet TS1 updates the HTML page for browser B 1, which then displays the updated HTML page for $U_A$, as shown in steps 427 and 428, and the terminal servlet TS1 sends an acknowledgement message back to TS2, as shown in step 429. In step 430, terminal servlet TS2 forwards the acknowledgement message to browser B2. If no additional modifications are desired, the end-users may terminate the shared conversational multimedia session as shown in steps 431 and 432.

Herein below, three specific scenarios are presented to further illustrate the features of the present invention. In all three scenarios, it is assumed that there are two end-users, $U_A$ and $U_B$, that both $U_A$ and $U_B$ have access to the same database (e.g., image database) through a server, and that $U_A$, for example, is capable communicating directly with and forwarding media objects to $U_B$, as illustrated in FIG. 2.

Figure 5:
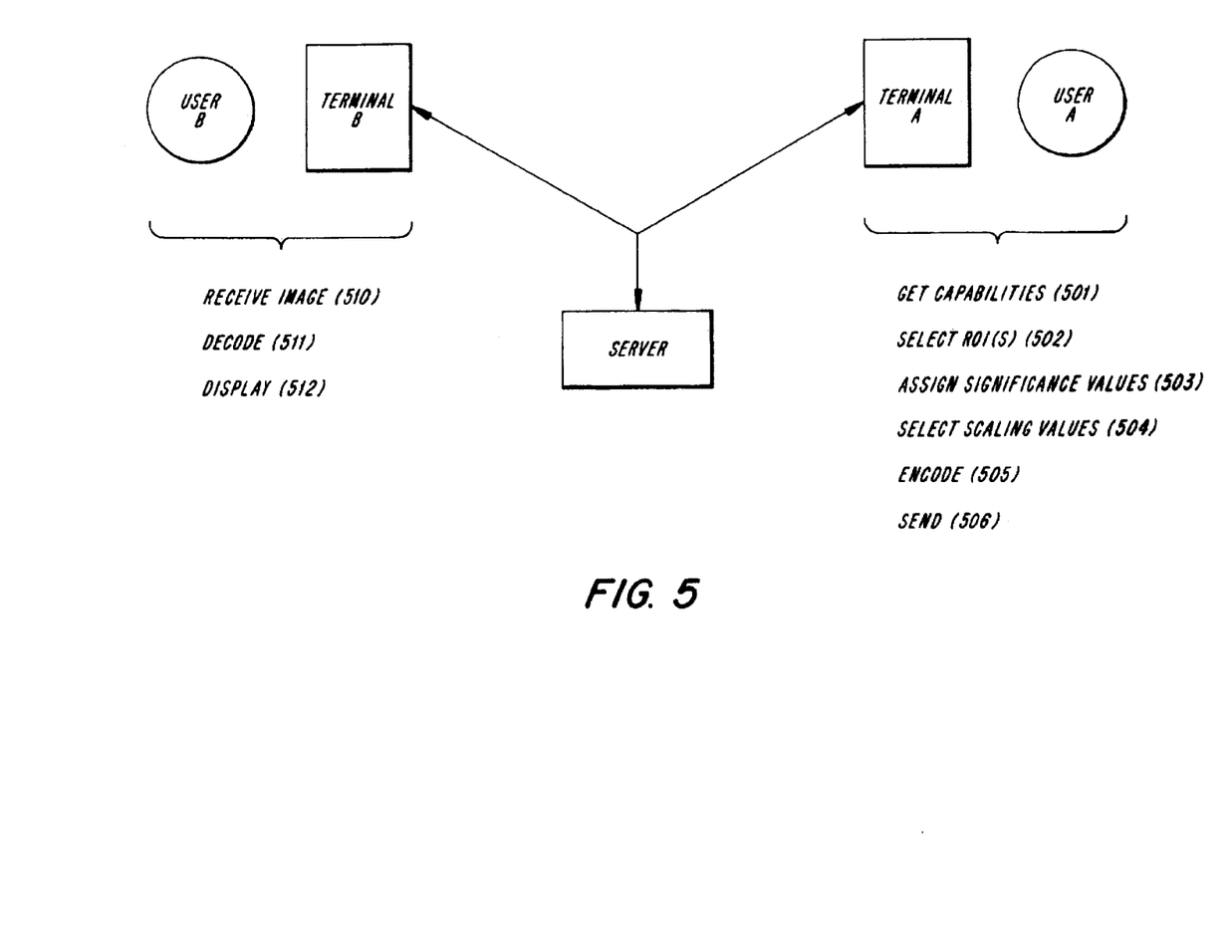
FIG. 5 illustrates a first scenario, in accordance with exemplary embodiments of the present invention, where a media object is transferred directly from a first end-user to a second end-user, along with a number of ROIs which have been selected by the first end-user.

FIG. 5 illustrates the steps associated with a first scenario, where a media object (e.g., a still image) is transferred directly from $U_A$ to $U_B$, along with a number of ROIs from the image which $U_A$ has selected. As shown in step 501, $U_A$ must first obtain the capabilities of the terminal employed by $U_B$. Then, in accordance with step 502, $U_A$ selects one or more ROIs from the image. After selecting the one or more ROIs, $U_A$ assigns a significance value to each of the one or more ROIs, as shown in step 503. The information and/or data that defines the one or more ROIs, selected by $U_A$ in step 502, and the significance values which $U_A$ assigned thereto, in step 503, constitutes the user preference data established by $U_A$.

In accordance with exemplary embodiments of the present invention, an IAS may now be employed to prioritize and/or limit the number of ROIs that were selected by $U_A$. As explained previously, the IAS performs this function based on the user preference information that resulted from $U_A$ selecting the one or more ROIs in step 502 and assigning each a significance value in step 503. The IAS may, in addition, perform this function based on user preferences associated with $U_B$. The IAS also performs this function based on the terminal and/or network capability information that was received in step 501. In order to simplify the following discussion, however, it is assumed that all of the ROIs selected by $U_A$ will be forwarded to $U_B$.

A TSS is then employed to scale the one or more ROIs. In a preferred embodiment, the TSS performs this scaling in accordance with the ROI coding feature associated with the JPEG2000 standard. The ROI coding feature and the JPEG2000 standard are known in the art. In order to scale the ROIs, however, a scaling value must be selected for each of the one or more ROIs, as shown in step 504, where the scaling value associated with each ROI is based on certain user preference information, namely, the significance value that was assigned to each ROI by $U_A$. Thus, if the ROI was assigned a large significance value, it will also have a large scaling value. More specifically, if $U_A$ only selects one ROI from the image, the scaling value is preferably selected so that it satisfies the MAXSHIFT value according to the ROI coding feature. However, if $U_A$ selects more than one ROI from the image, then the scaling values are preferably selected such that a significance value of 1 corresponds with a MAXSHIFT scaling value, while a significance value of 0 corresponds with no scaling. For example, if $U_A$ selects two ROIs and the background image, and if $U_A$ assigns a significance value of 1 to the first ROI, a significance value of 0.5 to the second ROI, and a significance value of 0.1 to the background image, then the scaling value for the first ROI is selected to be the MAXSHIFT value, and the scaling value for the second ROI is selected to be one-half the MAXSHIFT value.

The TSS then encodes the image data, as indicated in step 505, where encoding may, once again, be achieved in accordance with the ROI coding feature of the JPEG2000 standard. As one skilled in the art will readily appreciate, encoding will take into account the above-identified scaling values. In addition, and in accordance with exemplary embodiments of the present invention, the TSS takes into account the terminal and/or network capabilities associated with the terminal employed by $U_B$ when encoding the image data. Thus, encoding is achieved in such a manner that the capabilities of terminal B are maximized.

Once the image has been encoded, it is sent directly to $U_B$, as shown in step 506. The specific way in which the image is sent will depend upon the protocol that is used. However, when terminal B receives the image, it is decoded using the appropriate decompression method, for example, the JPEG2000 standard, and displayed for $U_B$, as shown in steps 510–512.

It should be noted that the same technique may be used when there are more than two end-users. Had there been more than two end-users, it may have been necessary to consider the capabilities of the terminals associated with more than just one end-user. It should also be noted that in a centralized solution, similar to that which was described above with respect to FIG. 3, a multipoint controller may have been employed to receive the terminal capabilities of all involved terminals, and, based thereon, adapt the image accordingly.

Figure 6:
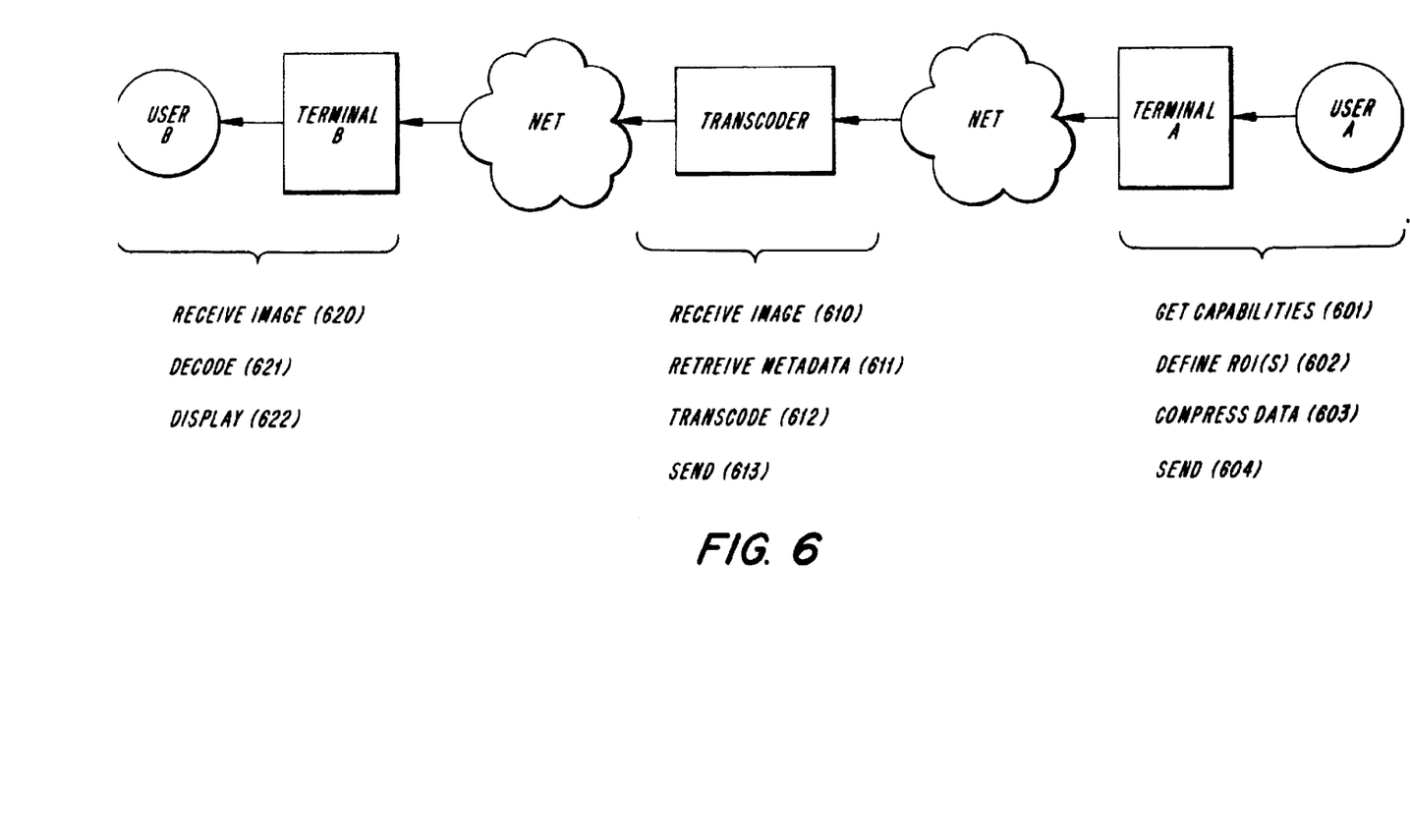
FIG. 6 illustrates a second scenario, in accordance with exemplary embodiments of the present invention, wherein a media object is transferred from a first end-user to a second end-user, along with a number of selected ROIs, using a transcoder.

FIG. 6 illustrates the components and steps associated with a second scenario, wherein a media object (e.g., a still image) is transferred, along with a number of selected ROIs, from $U_A$ to $U_B$ using a transcoder. In certain situations, an end-user doesn't have the capability to generate a separate JPEG2000 compliant bit stream. This may be the case where more than one ROI is selected from the image, or when the conversational multimedia session involves more than two end-users, and each is employing a terminal with different capabilities. In either of these situations, one version of the image may be sent, along with the selected ROIs, to a transcoder, where the transcoder is preferably located in a gateway in the network. The function of the transcoder is to adapt or transcode the image data so that each receiving terminal receives a version of the image that best satisfies its corresponding capabilities.

In accordance with this second scenario, and as illustrated in FIG. 6, the following operations are performed at the terminal employed by the sending end-user $U_A$. In step 601, $U_A$ obtains the terminal capabilities associated with terminal B, in accordance with the appropriate protocol (e.g., CC/PP or SIP). $U_A$ then selects one or more ROIs from the image and assigns to each a significance value, as shown in step 602. The image is then compressed, for example, using the JPE2000 standard, as shown in step 603. The compressed data, along with the significance value associated with each of the selected ROIs, and the information and/or data that defines the capabilities of terminal B are multiplexed into a bitstream, where the significance values and the terminal B capability information may be included as metadata, as for example, in the MPEG-7 standard. In step 604, the bitstream is transmitted to the transcoder.

Further in accordance with this second scenario, the following operations are performed by the transcoder after it receives the bitstream, as shown in step 610. In step 611, the transcoder extracts from the bitstream the location of and corresponding significance value of each ROI. The transcoder may, at this point, employ an IAS to prioritize and/or limit the image data based on the previously defined user preference information (e.g., the significance value information associated with each ROI), as well as any user preference information associated with $U_B$, and capability information associated with terminal B. In order to simplify the discussion, however, it is assumed that all of the one or more ROIs selected by $U_A$ are transcoded and forwarded to $U_B$.

In accordance with step 612, the transcoder may then employ a TSS, which relies on the user preference information and the terminal and/or network capability information associated with terminal B to transcode the image data. As one skilled in the art will understand, the transcoding process may proceed in accordance with the JPEG2000 standard, where, for example, the transcoder derives a set of ROI coefficients (i.e., an ROI mask). The process of deriving a set of ROI coefficients is described in greater detail in the "*JPEG2000 Final Draft International Standard*", Part I, ISO/IEC JTC1/SC29WG01 N1855, Aug. 18, 2000, the contents of which are incorporated herein by reference. The coefficients are then scaled as a function of the corresponding significance value. The scaled coefficients are then encoded, based on the information and/or data defining the capabilities of terminal B. The transcoder then transmits the image data to terminal B, as shown in step 613.

At terminal B, the image data is received, as indicated by step 620. Terminal B then decodes the image data in accordance with the JPEG2000 standard, or other applicable decompression method, and the decoded image is displayed for $U_B$, as shown in steps 621 and 622, respectively.

Figure 7:
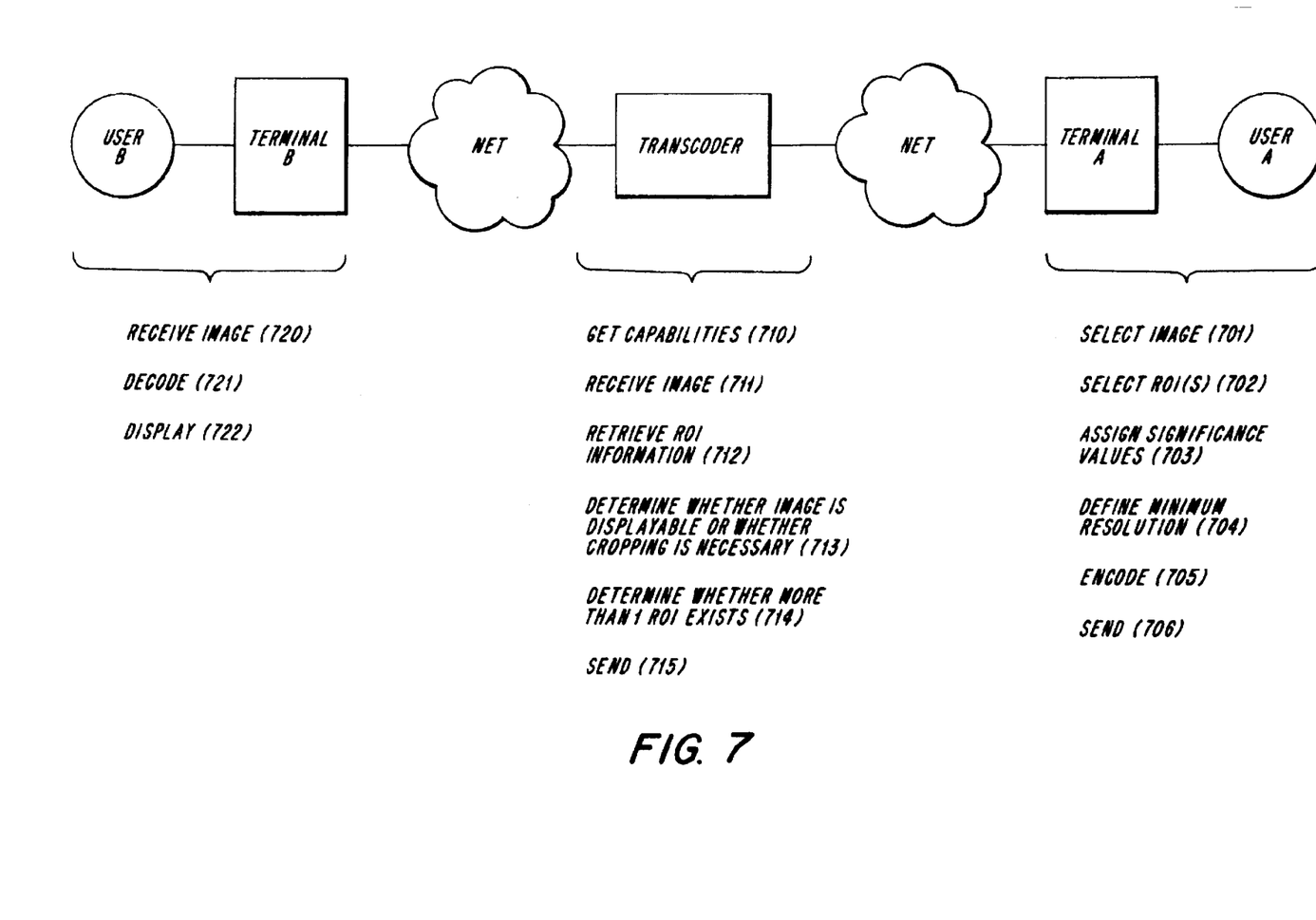
FIG. 7 illustrates a third scenario, in accordance with exemplary embodiments of the present invention, wherein a media object is transferred from a first end-user to a second end-user, along with information relating to one or more selected ROIs, using a transcoder.

FIG. 7 is a diagram illustrating the components and steps associated with a third scenario, wherein a media object (e.g., a still image) is transferred, along with information relating to one or more selected ROIs, from one end-user (e.g., $U_A$) to another (e.g., $U_B$). As in the previously described scenario, a transcoder is employed to adapt and encode the image data prior to sending the image data to one or more receiving terminals (e.g., terminal B). Unlike the previously described scenario, however, this scenario provides a solution where the image is too large for the display associated with the receiving terminal.

It is quite possible that the image $U_A$ wishes to share with $U_B$ is too large for the display associated with terminal B. One solution to this problem, of course, is to send the ROI information prior to or without the background information. But this does not guarantee that $U_B$ will receive an image with good image quality. Another solution is to transmit the entire image after reducing the resolution of the image. As one skilled in the art will readily appreciate, this too does not guarantee that $U_B$ will receive an image with good image quality.

To facilitate the description of this scenario, the following assumptions are made. First, it is assumed that one or more ROIs have been selected from the image. Second, it is assumed that each ROI has been assigned a significance value. Third, it is assumed that the entire image is large enough to fit the display associated with terminal B, and that it is of particular importance that the receiving end-user, $U_B$, receives the one or more ROIs with a high level of image quality. Fourth, because the resolution of terminal B may be low, it is useful for $U_A$ to define the minimum resolution associated with each of the one or more ROIs. If, for example, the minimum resolution of a given ROI is 100×100 pixels, the resolution of the entire image is 1K×1K pixels, and the resolution of the receiving terminal's display is 100×100 pixels, it might be useful to only transmit the ROI.

Given the above-identified assumptions, and as illustrated in FIG. 7, UA initially performs a number of operations, which establishes the user preference information. For example, in steps 701–703, $U_A$ selects an image, selects one or more ROIs from the image, and defines a significance value for each of the one or more ROIs. In addition, $U_A$ defines a minimum resolution for each of the one or more ROIs, wherein the minimum resolution represents the lowest resolution at which the ROI can be displayed. Defining the minimum resolution is shown in step 704. Then, in steps 705 and 706, the image data, as well as the information and/or data that defines the location of, the shape of, the significance of and the minimum resolution of each ROI is encoded and sent to the transcoder.

As in the previously described scenario, the transcoder may be associated with a gateway or server within the network, or alternatively, within terminal B, wherein the following operations may be performed. As shown in step 710, the transcoder obtains the capabilities of terminal B, in accordance with the appropriate protocols (e.g., CC/PP or SIP). The transcoder then receives the image data from $U_A$, along with the other information and/or data relating to the one or more ROIs, as shown in step 711. The information and/or data relating to the ROIs is then extracted by the transcoder, as shown in step 712. In accordance with step 713, the transcoder then determines whether the image quality of the one or more ROIs would be satisfactory if the entire image is displayed at terminal B. This determination is, once again, based on user preference information relating to the one or more ROIs, as well as any user preference information associated with $U_B$, and the terminal and/or network capabilities associated with terminal B. If the transcoder determines that the image quality of the one or more ROIs would be satisfactory, the image data may be transmitted to terminal B without modification. Alternatively, the transcoder may employ an IAS to select only those ROIs having the highest significance values. Then the transcoder may employ a TSS to modify the resolution of these ROIs. If, however, the IAS determines, based on the user preference information and the terminal and/or network capability information, that the image quality of the one or more ROIs would not be satisfactory, the TSS may be used to crop the image. The cropped image may include but one of the ROIs, only those ROIs having the greatest significance values, or all of the ROIs without any of the image background information.

If, in accordance with step 714, more than one ROI has been selected, and it has been determined that all of the ROIs can be displayed with satisfactory image quality, the transcoder may perform a number of additional operations. For example, the transcoder may derive a smallest bounding box that encloses all of the selected ROIs. Then, it may crop the image so that only the contents within the bounding box remain. The transcoder may then encode the cropped image in accordance with the capabilities of terminal B prior to transmitting the image data according to step 715.

As in the previously described scenarios, terminal B eventually receives the image data, as shown in step 720. It then decodes the image using, for example, the JPEG2000 standard, or other appropriate decompression method, and displays the decoded image for UB, as shown in steps 721 and 722.

The present invention has been described with reference to a number aspects, exemplary embodiments, and detailed scenarios. However, it will be readily apparent to those skilled in the art that it is possible to present the invention in forms other than those described above without departing from the spirit of the invention. Thus, the various aspects, embodiments and scenarios described herein above are to be considered illustrative; they should not be considered restrictive in any way. The scope of the invention is given by the appended claims, rather than the preceding description, and all variations and equivalents thereof which fall within the range of the claims are intended to be embraced therein.

What is claimed is:

1. A method for providing an intelligent multimedia services environment in a network, comprising the steps of:
    responsive to a request by an end user, a first terminal device coupled to the network establishing a session with a media server and initiating a multimedia application that is shared by a second terminal device;
    simultaneously, the first and second terminal devices sharing and manipulating multimedia data from one or more multimedia databases;
    selecting the multimedia data according to user preferences utilizing a first application associated with the multimedia application;
    adapting the multimedia data according to terminal device capabilities and network capabilities utilizing a second application associated with the multimedia application;
    providing communication between the first terminal device and the second terminal device and the multimedia data and the multimedia application;
    determining preferences of the first and second terminal devices; and
    automatically adapting the multimedia data to satisfy the determined preferences and the terminal device and network capabilities of the first and second terminal devices prior to sending the multimedia data to the first and second terminal devices.

2. The method of claim 1, further comprising the step of transmitting commands between the first and second terminal devices defining operations and manipulations required in the shared multimedia data received by the first and second terminal devices.

3. The method of claim 1, wherein the determined preferences of the terminal devices include user preferences, terminal device capabilities, and network capabilities.

4. The method of claim 3, further comprising the step of sharing preferences of each of the first and second terminal devices with all connected terminal devices.

5. The method of claim 4, further comprising the step of storing the user preferences, terminal device capabilities and network capabilities at a Universal Resource Locator (URL) address.

6. The method of claim 5, further comprising the steps of:
    identifying a multimedia data set stored in the one or more multimedia data bases;
    utilizing the second application to modify the multimedia data set according to the user preferences, terminal device capabilities; and network capabilities, wherein the second application is a transcoder/scalability service; and
    making the modified multimedia data set available to one or more terminal devices connected to the network.

7. The method of claim 6, further comprising the steps of:
    scaling the modified multimedia data set according to one or more significance values associated with each element of the modified multimedia data set; and encoding the modified multimedia set according to the terminal capabilities and communication connection capabilities.

8. The method of claim 6, wherein the multimedia data set comprises one of, or a combination of two or more:
    a still image;
    one or more regions of interest of the still image;
    a cropped portion of the still image;
    a video object; and
    a segment of the video object.

9. The method of claim 6, wherein the user preferences comprise:
    a number of elements that constitute the multimedia data set,
    a significance value assigned to each element of the multimedia data set; and
    a price associated with making the modified multimedia data set available to the one or more terminal devices.

10. The method of claim 6, wherein the terminal device capabilities include:
    a level of resolution and an amount of processing power associated with each of the one or more end user terminal devices connected to the multimedia data set.

11. A multimedia system associated with a network, comprising:
    a first terminal device coupled to the network for establishing a session with a media server and for initiating a multimedia application;
    a second terminal device for simultaneously sharing and manipulating multimedia data with the first terminal device, from one or more multimedia databases;
    a server coupled with, and providing communication between, the first terminal device and the second terminal device and the multimedia data and the multimedia application;
    a first application associated with the multimedia application for selecting the multimedia data according to user preferences
    a second application associated with the multimedia application for adapting the multimedia data according to terminal device and network capabilities; and
    at least one transcoder coupled with the media server for automatically adapting the multimedia data to satisfy the preferences of the first and second terminal devices and the capabilities of the network and the first and second terminal devices prior to sending the adapted multimedia to the first and second terminal devices.

12. The multimedia system of claim 11, further comprising means for transmitting commands between the first and second terminal devices defining operations and manipulations required in the shared multimedia data received by the terminal devices.

13. The multimedia system of claim 11, wherein the determined preferences of the first and second terminal devices include user preferences, terminal device capabilities; and network capabilities.

14. The multimedia system of claim 11, wherein the at least one transcoder further comprises a scalability function for modifying the multimedia data.

15. The multimedia system of claim 14, wherein the transcoder is capable of communicating with each of the first and second terminal devices over a network connection.

16. The multimedia system of claim 15, wherein the transcoder is associated with a server.

17. The multimedia system of claim 15, wherein the transcoder is associated with a gateway device.

18. The multimedia system of claim 11, wherein the multimedia data comprises one of, or a combination of:

a still image;

one or more regions of interest of the still image;

a cropped portion of the still image;

a video object; and a segment of the video object.

19. The multimedia system of claim 11, further comprising:

a multimedia data set stored in the first and second multimedia data bases;

a transcoder/scalability means for encoding, scaling and compressing the multimedia data set according to the user preferences, terminal device capabilities; and network capabilities; and a means for making the modified multimedia data set available to one or more terminal devices.

20. The multimedia system of claim 11, wherein the server further comprises a multipoint controller.

* * * * *